US011416306B1

(12) United States Patent
Gussin et al.

(10) Patent No.: US 11,416,306 B1
(45) Date of Patent: Aug. 16, 2022

(54) PLACEMENT TO OPTIMIZE HETEROGENEOUS PHYSICAL HOST UTILIZATION

(71) Applicant: Amazon Technologies, Inc., Seattle, WA (US)

(72) Inventors: Bradley Joseph Gussin, Seattle, WA (US); Diwakar Gupta, Seattle, WA (US); Michael Phillip Quinn, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 409 days.

(21) Appl. No.: 16/007,904

(22) Filed: Jun. 13, 2018

(51) Int. Cl.
  *G06F 9/50* (2006.01)
  *G06F 9/455* (2018.01)
  *H04L 47/70* (2022.01)
  *H04L 43/0876* (2022.01)

(52) U.S. Cl.
  CPC ........ *G06F 9/5077* (2013.01); *G06F 9/45558* (2013.01); *H04L 43/0876* (2013.01); *H04L 47/70* (2013.01); *G06F 2009/45562* (2013.01); *G06F 2009/45591* (2013.01); *G06F 2209/5011* (2013.01)

(58) Field of Classification Search
  None
  See application file for complete search history.

(56) References Cited

U.S. PATENT DOCUMENTS

| 9,471,352 | B1 * | 10/2016 | Mauer | G06F 9/45558 |
|---|---|---|---|---|
| 2013/0111468 | A1 * | 5/2013 | Davis | G06F 9/5077 |
| | | | | 718/1 |
| 2014/0258446 | A1 * | 9/2014 | Bursell | H04L 41/0816 |
| | | | | 709/217 |
| 2015/0039764 | A1 * | 2/2015 | Beloglazov | G06F 9/5088 |
| | | | | 709/226 |
| 2015/0334040 | A1 * | 11/2015 | Crowell | H04L 12/6418 |
| | | | | 709/226 |
| 2017/0195247 | A1 * | 7/2017 | Tao | H04L 67/32 |
| 2017/0315838 | A1 * | 11/2017 | Nidugala | H04L 67/1095 |

* cited by examiner

*Primary Examiner* — Meng Ai T An
*Assistant Examiner* — Zujia Xu
(74) *Attorney, Agent, or Firm* — Nicholson De Vos Webster & Elliott LLP

(57) ABSTRACT

Techniques for managing resource utilization across heterogeneous physical hosts are described. Resource utilization of a first plurality of physical hosts in a provider network may be monitored, each physical host comprising a plurality of resources. A future resource utilization can be determined, the future resource utilization including quantities of a plurality of resource types. The future resource utilization can be matched to a plurality of physical host types, each physical host type associated with a different plurality of resources. A second plurality of physical hosts corresponding to the plurality of physical host types can be deployed to the provider network.

20 Claims, 7 Drawing Sheets

PLACEMENT TO OPTIMIZE HETEROGENEOUS PHYSICAL HOST UTILIZATION

BACKGROUND

Many companies and other organizations operate computer networks that interconnect numerous computing systems to support their operations, such as with the computing systems being co-located (e.g., as part of a local network) or instead located in multiple distinct geographical locations (e.g., connected via one or more private or public intermediate networks). For example, data centers housing significant numbers of interconnected computing systems have become commonplace, such as private data centers that are operated by and on behalf of a single organization, and public data centers that are operated by entities as businesses to provide computing resources to customers. Some public data center operators provide network access, power, and secure installation facilities for hardware owned by various customers, while other public data center operators provide "full service" facilities that also include hardware resources made available for use by their customers. However, as the scale and scope of typical data centers has increased, the tasks of provisioning, administering, and managing the physical computing resources have become increasingly complicated.

The advent of virtualization technologies for commodity hardware has provided benefits with respect to managing large-scale computing resources for many customers with diverse needs, allowing various computing resources to be efficiently and securely shared by multiple customers. For example, virtualization technologies may allow a single physical computing machine to be shared among multiple users by providing each user with one or more virtual machines hosted by the single physical computing machine, with each such virtual machine being a software simulation acting as a distinct logical computing system that provides users with the illusion that they are the sole operators and administrators of a given hardware computing resource, while also providing application isolation and security among the various virtual machines. Furthermore, some virtualization technologies are capable of providing virtual resources that span two or more physical resources, such as a single virtual machine with multiple virtual processors that spans multiple distinct physical computing systems. As another example, virtualization technologies may allow data storage hardware to be shared among multiple users by providing each user with a virtualized data store which may be distributed across multiple data storage devices, with each such virtualized data store acting as a distinct logical data store that provides users with the illusion that they are the sole operators and administrators of the data storage resource.

BRIEF DESCRIPTION OF DRAWINGS

Various embodiments in accordance with the present disclosure will be described with reference to the drawings, in which.

DETAILED DESCRIPTION

Various embodiments of methods, apparatus, systems, and non-transitory computer-readable storage media for managing resource utilization across heterogeneous physical hosts are described. According to some embodiments, resource utilization may be monitored to determine how efficiently resources of a provider network are being used by customers and/or the provider network itself. Some provider networks may include physical hosts that host a single virtual machine instance type. In such networks, utilization may be measured based on the capacity of the provider network to host virtual machines of the instance type against the number of instances of that type being used by customers. Virtual machine instance types may include general purpose instances, high performance instances, memory-optimized instances, graphics processing instances, accelerated computing instances, storage instances, etc.

However, increasingly, physical hosts may be configured to host multiple virtual machine instance types. Each instance type may be associated with different resource requirements (e.g., memory-optimized instances may have more dedicated Random Access Memory (RAM), while a high performance instance may have more dedicated Central Processing Units (CPUs)). In such heterogeneous server fleets, utilization by instance type may not accurately measure resource utilization as different instance types can run on multiple hardware platforms. For example, a physical host that has graphics processing units (GPUs) may be completely utilized (or hosting a maximum number of instances) by hosting a number of storage instances. However, if none of the storage instances are using the GPUs, then those GPUs are underutilized resources in that they potentially could be used but instead sit idle. Embodiments monitor resource usage to determine utilization of available resources. The monitored resource usage can be used to make placement decisions of instances across a fleet of physical hosts to increase resource utilization. The monitored resource usage can also be used to determine physical host resource configurations to be deployed to meet estimated future demand.

Figure 1:
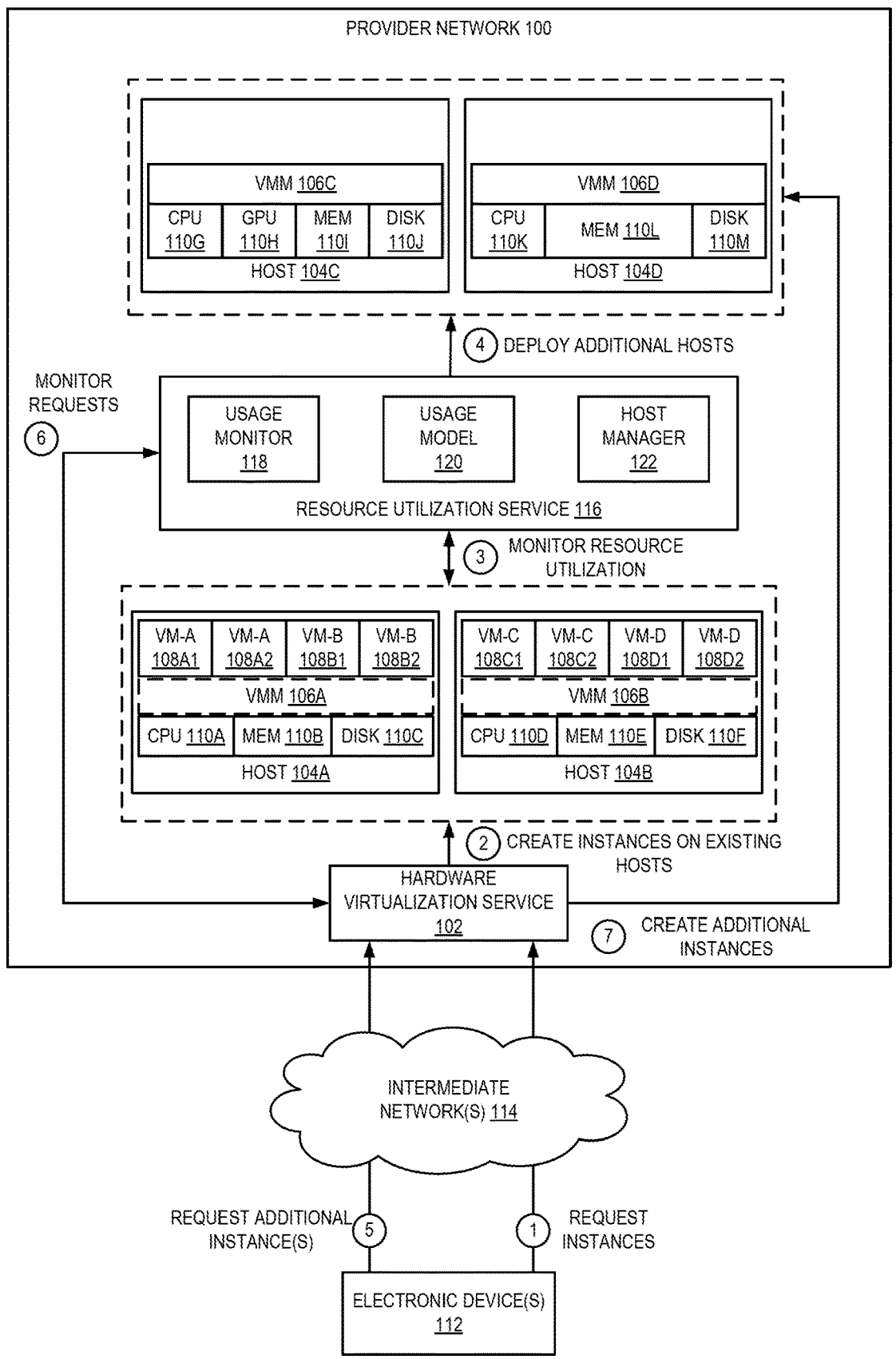
FIG. 1 is a diagram illustrating an environment for monitoring resource utilization across heterogeneous physical hosts according to some embodiments.

FIG. 1 is a diagram illustrating an environment for monitoring resource utilization across heterogeneous physical hosts according to some embodiments. A provider network 100 provides users with the ability to utilize one or more of a variety of types of computing-related resources such as compute resources (e.g., executing virtual machine (VM) instances and/or containers, executing batch jobs, executing code without provisioning servers), data/storage resources (e.g., object storage, block-level storage, data archival storage), network-related resources (e.g., configuring virtual networks including groups of compute resources, content delivery networks (CDNs), Domain Name Service (DNS)), application resources (e.g., databases, application build/deployment services), etc. These and other computing resources may be provided as services, such as a hardware virtualization service 102 that can execute compute instances, a storage virtualization service that can store data objects, etc. The users (or "customers") of provider networks 100 may utilize one or more user accounts that are associated with a customer account, though these terms may be used somewhat interchangeably depend ending upon the context of use. Users may interact with a provider network 100 across one or more intermediate networks 114 (e.g., the internet) via one or more interface(s), such as through use of application programming interface (API) calls, via a console implemented as a website or application, etc. The interface(s) may be part of, or serve as a front-end to, a control plane of the provider network 100 that includes "backend" services supporting and enabling the services that may be more directly offered to customers.

To provide these and other computing resource services, provider networks 100 often rely upon virtualization techniques. For example, virtualization technologies may be used to provide users the ability to control or utilize compute instances (e.g., a VM using a guest operating system (O/S) that operates using a hypervisor that may or may not further operate on top of an underlying host O/S, a container that may or may not operate in a VM, an instance that can execute on "bare metal" hardware without an underlying hypervisor), where one or multiple compute instances can be implemented using a single electronic device. Thus, a user may directly utilize a compute instance hosted by the provider network to perform a variety of computing tasks, or may indirectly utilize a compute instance by submitting code to be executed by the provider network, which in turn utilizes a compute instance to execute the code (typically without the user having any control of or knowledge of the underlying compute instance(s) involved).

Provider network 100 may include hardware virtualization technology that enables multiple operating systems to run concurrently on a host computer (e.g., hosts 104A-104D), i.e. as virtual machines (VMs) 108 on the hosts 104. The VMs 108 may, for example, be executed in virtualization guest locations on the hosts 104 that are rented or leased to customers of a network provider. A hypervisor, or virtual machine monitor (VMM) 106, on a host 104 presents the VMs 108 on the host with a virtual platform and monitors the execution of the VMs 108. Each VM 108 may be provided with one or more local IP addresses; the VMM 106 on a host 104 may be aware of the local IP addresses of the VMs 108 on the host. The provider network 100 may, for example, provide customers the ability to implement virtual computing systems (e.g., VMs 108) via a hardware virtualization service 102. Each physical host 104 may include resources 110, such as CPUs 110A, 110D, 110G, 110K; graphics processing units 110G-110H; memory 110B, 110E, 110I, 110L; and disk space 110C, 110F, 110J, 110M. Additional resources, not shown, may also be provided by hosts 104, such as network bandwidth (e.g., via network interfaces), accelerators, field programmable gate arrays (FPGAs), etc. Each VM on a given host may be allocated a portion of the available resources on that host when the VM is placed on the host.

As shown in FIG. 1, the user (e.g., operating electronic device 112) can send a request to hardware virtualization service 102 to setup one or more VM instances on hosts 104, as shown as numeral 1. As shown at numeral 2, hardware virtualization service can create one or more instances on existing hosts to service the request. For example, one or more virtual machines of a first instance type (VM-A) and a second instance type (VM-B) can be deployed to host 104A and each instance allocated a portion of resources 110A-110C on host 104A. Additionally or alternatively, one or more virtual machines of a third instance type (VM-C) and/or a fourth instance type (VM-D) can be deployed to host 104B and each instance allocated a portion of resources 110D-110F on host 104A. Of note, these various VMs may be deployed (and thus operate) on behalf of one user or multiple users within the provider network 100.

Resource utilization service 116 can monitor resource utilization of hosts 104A and 104B, as shown at numeral 3. In some embodiments, usage monitor 118 can determine a total resource pool and monitor resource demand. In some embodiments, the resource utilization service 116 can monitor resources in a particular area or space, such as an aisle of a data center, a server rack, a group of server racks, a floor or building, a "region" including one or multiple data centers, a "zone" within a region, a city, a state, a country, etc. Usage monitor 118 can determine the resource pool by querying physical hosts in the provider network 100 for the resource configuration of each physical host (e.g., CPU, memory, disk resources, accelerators, FPGAs, etc.). In some embodiments, resource configurations may be provided manually to the usage monitor 118 through an administrative console or other user interface.

In some embodiments, usage monitor 118 can determine utilization of the resource pool using a weighted average of the number of virtual machine instances running on a physical host compared to a total number of slots available on the physical host. For example, if a physical host is configured with three slots for a first VM type and seven slots for a second VM type, then the resource pool includes three virtual machines of the first VM type and seven virtual machines of the second VM type. Usage may then be calculated for each as the number of each VM type in use divided by the pool of the VM type. In some embodiments, where different sizes of a given VM type can be created, the number of virtual machines in use and the pool of the VM type can be normalized to the smallest size available of the VM type.

In some embodiments, usage monitor 118 can determine utilization of each of the distinct resource 110 available across a fleet of physical hosts 104. In such embodiments, the resource pool may include a total for each resource type across a fleet of physical hosts. For example, if a fleet includes a single physical host, and the physical host is configured with 8 CPUs, 256 GB of memory, and 500 GB of disk storage, then the resource pool includes 8 CPUs, 256 GB of memory, and 500 GB of disk storage. In a fleet of multiple physical hosts, each resource type across the physical hosts can be summed to determine the resource pool. Usage may then be calculated for each resource type as the amount of each resource type in use divided by the pool of that resource type.

In some embodiments, each resource type can be cost-weighted. Utilization can then be calculated across all resources using cost-weighted resources (e.g., "normalized resources"). For example, if a physical host has 10 units of memory, 10 units of CPU, and 10 units of disk, and CPU costs twice as much as memory and three times as much disk, then the total "normalized resources" for that platform moving forward can be determined to be 60 normalized resources (e.g., 10 CPU+2*10 Memory+3*10 Disk). Additionally, some resources may be oversubscribed (e.g., available to be used by multiple VMs). Resources may be normalized based on the maximum amount a resource type may be oversubscribed.

Usage model 120 can be a machine learning model trained using past usage data determined by usage monitor 118. Usage model 120 can determine a future resource utilization based on current resource utilization. In some embodiments, usage model 120 can be used to determine a short-term future resource utilization (e.g., days or hours) and/or a long-term future resource utilization (e.g., weeks or months). Future resource utilization can be expressed in terms of distinct resources 110 and/or particular instance types. Based on the future resource utilization, host manager 122 can determine which physical host types to be deployed at numeral 4. In some embodiments, the physical host types may be determined based on the future resource utilization as well as a fulfillment time associated with each host type. For example, multiple physical hosts of a first physical host type may be needed to meet expected resource demand, while fewer physical hosts of a second physical host type may be needed to meet expected resource demand. However, a time to fulfilment (e.g., an amount of time needed to obtain) each physical host type may be different. If the time to fulfilment of the second physical host type is too long to meet the expected demand, then physical hosts of the first physical host type may instead be obtained and deployed. Likewise, a cost of each physical host type may also be a factor in determining which physical host type to obtain and deploy.

In some embodiments, host manager 122 can match the future resource utilization data to physical host types. As discussed, different physical hosts can have different resource configurations. Depending on which resources are demanded, based on future resource utilization, physical host types can be selected to provide those resources. For example, if more high-performance instance types are projected to be demanded, physical host 104C can be deployed which includes additional GPU resources 110H. Similarly, if additional memory is projected to be demanded, host 104D can be deployed which has been configured to have more memory resources 110L. In some embodiments, each physical host type can be represented as a bundle of resources, with different physical host types corresponding to different bundles of resources. In some embodiments, matching projected demand to the physical host types can be performed using a matching algorithm, such as a bin packing algorithm.

As additional VMs are requested, as shown at numeral 5, the VMs can be placed on the additional physical hosts that have been deployed. In some embodiments additional instances may be requested by customers using electronic devices 112 or requested by resource utilization service 116. The additional requests can be monitored by the resource utilization service 116, at numeral 6, and compared to the projected demand in a feedback loop. The differences between the projected demand and actual demand can be used to further train the usage model 120 to increase the accuracy of projected demand in the future. At numeral 7, the additional VMs can be placed on the newly deployed hosts.

Figure 2:
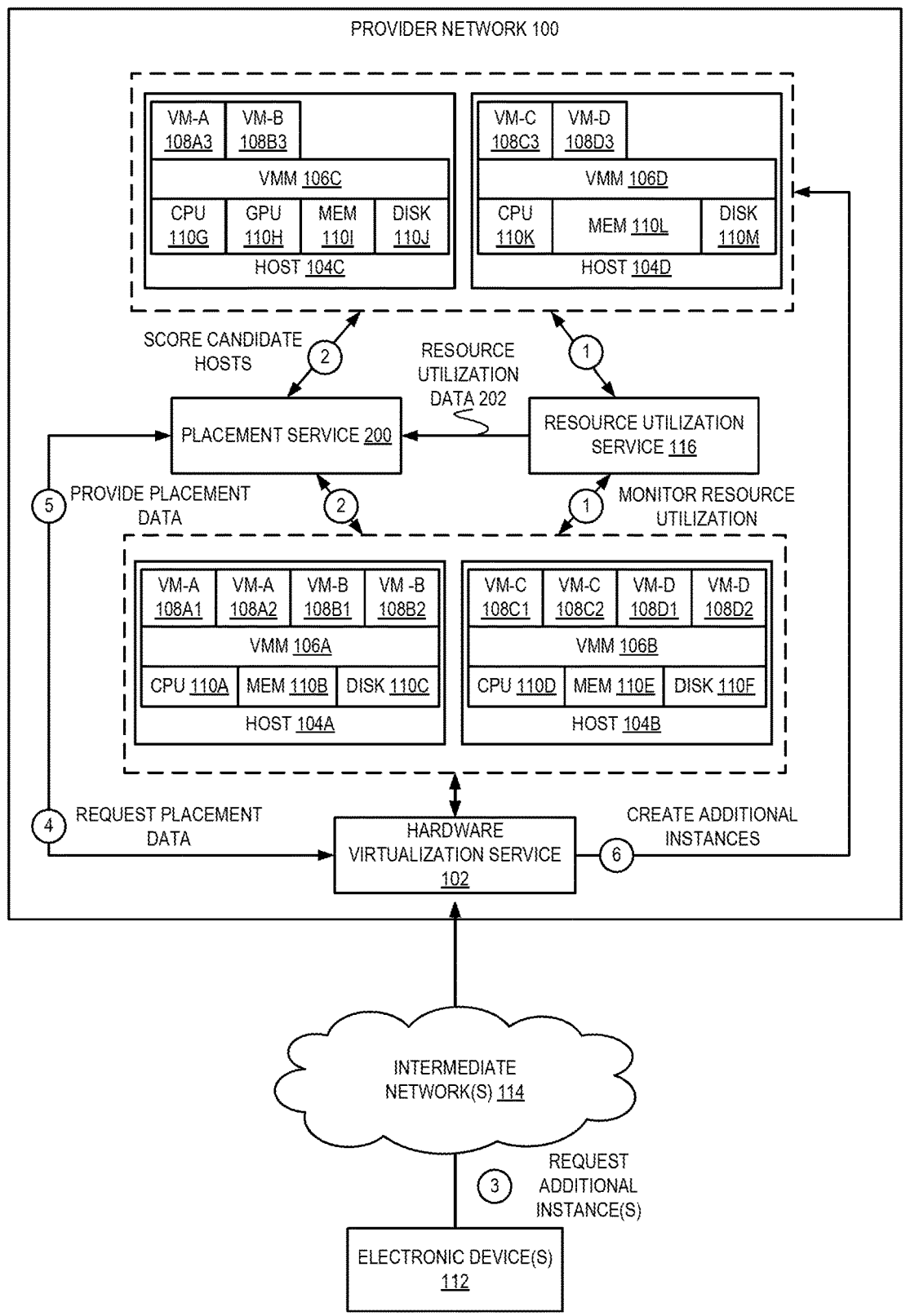
FIG. 2 is a diagram illustrating an environment for placing additional virtual machine instances across heterogeneous physical hosts according to some embodiments.

FIG. 2 is a diagram illustrating an environment for placing additional virtual machine instances across heterogeneous physical hosts according to some embodiments. As discussed, a resource utilization service 116 can monitor resource utilization of physical hosts 104 in a provider network 100, as shown at numeral 1. As shown in FIG. 2, a placement service 200 can use resource utilization data 202 from resource utilization service 116 to determine where new VM instances are to be placed within the fleet of physical hosts. In some embodiments, candidate physical host scoring can be performed offline (e.g., prior to receipt of a request), as shown at numeral 2. Although placement service 200 is depicted separately from hardware virtualization service 102, this is for simplicity of explanation. In various embodiments, placement service 200 may be a component of hardware virtualization service 102 or may be a separate service. In some embodiments, placement service 200 can score candidate hosts based on a range of resources that can be allocated to a VM instance type. The range of resources may include up to X GB storage, up to Y CPUs, up to Z packets per second, etc.

In some embodiments, placement service 200 can preferentially place a VM instance type on a corresponding physical host type. For example, a particular physical host type may be designed to host a particular instance type, although the particular physical host type may be capable of hosting a variety of instance types. Placement service 200 may maintain a mapping of VM instance types to physical host types and place a new VM instance on a physical host of the corresponding type unless the placement is scored low by other factors. For example, placement service 200 may score each candidate host based on a risk of correlated failure (e.g., where an entity's VM instances are placed on the same physical host, same physical rack, etc., a single point of failure may affect all of the entity's hosts). As such, if multiple VM instances for a given entity (e.g., customer, user, etc.) are already placed on a physical host that corresponds to that VM instance type, another candidate slot on that physical host may be scored lower than a candidate slot on a different physical host, even if that different physical host is of a type that does not correspond to the VM instance type.

Additionally, in some embodiments, placement service 200 may use resource utilization data 202 to determine whether a given resource on a given physical host is likely to be used in the future. If resource utilization is unlikely, then placement service 200 may score slots on that physical host as though that resource are not present. For example, if a physical host includes a GPU, and future resource utilization data projects that GPUs are not in demand, then the slots on that physical host may be scored by placement service regardless of whether a particular instance type will make use of the GPU resource. Since the GPU is not likely to be in demand, stranding a GPU resource is not used to lower the placement score.

In some embodiments, placement service 200 may score candidate host slots based on the other instances that are already running on the physical host. For example, licensing requirements may be on a physical host by physical host basis, such that different size instances of the same instance type on the same physical host may require a single license, whereas if those instances were placed on different physical hosts multiple licenses may be required. As such, a candidate slot on a physical host that already has one or more instances of a given instance type running may score higher when placing a new instance of that given host type.

In some embodiments, placement service 200 may initiate live migration of instances if resource demand changes. For example, as discussed above, VM instances that do not use GPU resources may have been placed on physical hosts with GPUs, due to a lack of current and/or future demand for GPU resources. If demand changes, and GPU resource demand increases, the VM instances that have stranded unused GPU resources may be live migrated to other physical hosts without GPU resources to free up the demanded GPU resources. Although this example is discussed with reference to GPU resources, any demanded resource may lead to live migration of VM instances as needed.

In some embodiments, an offline pool manager, which may be a part of placement service 200, may determine when to bring additional physical hosts online based on current and/or future resource utilization. For example, if expected demand for a particular resource type is high, new physical hosts having the demanded resource type may be kept offline until that resource type is demanded. This may reduce the need to migrate instances off of those physical hosts, leading to less downtime and increasing utilization of available resources.

As shown at numeral 3, a request for one or more additional VM instances is sent by an electronic device 112 and received by the hardware virtualization service 102. At numeral 4, hardware virtualization service 102 can request placement data from placement service 200. The request can include the instance type or types being requested. Placement service can identify a candidate physical host with a highest score and provide a candidate physical host identifier in response to the hardware virtualization service at numeral 5. At numeral 6, the requested instance or instances can be placed on the candidate host identified in the placement data. In some embodiments, once the instance is running and in use by the customer, resource utilization service 116 can determine the actual usage of resources on the candidate physical host by the additional instance. Any resources allocated to that instance which are not being used may be returned to the resource pool as available for another instance or placement of a new instance.

In some embodiments, if the customer's VM instance attempts to increase the amount of resources being used, available resources can be reallocated to the VM instance. If additional resources are not available, the VM instance can be migrated to a different physical host. The migration may be to a physical host based on placement data from placement service 200 based on the amount of resources being requested.

Figure 3:
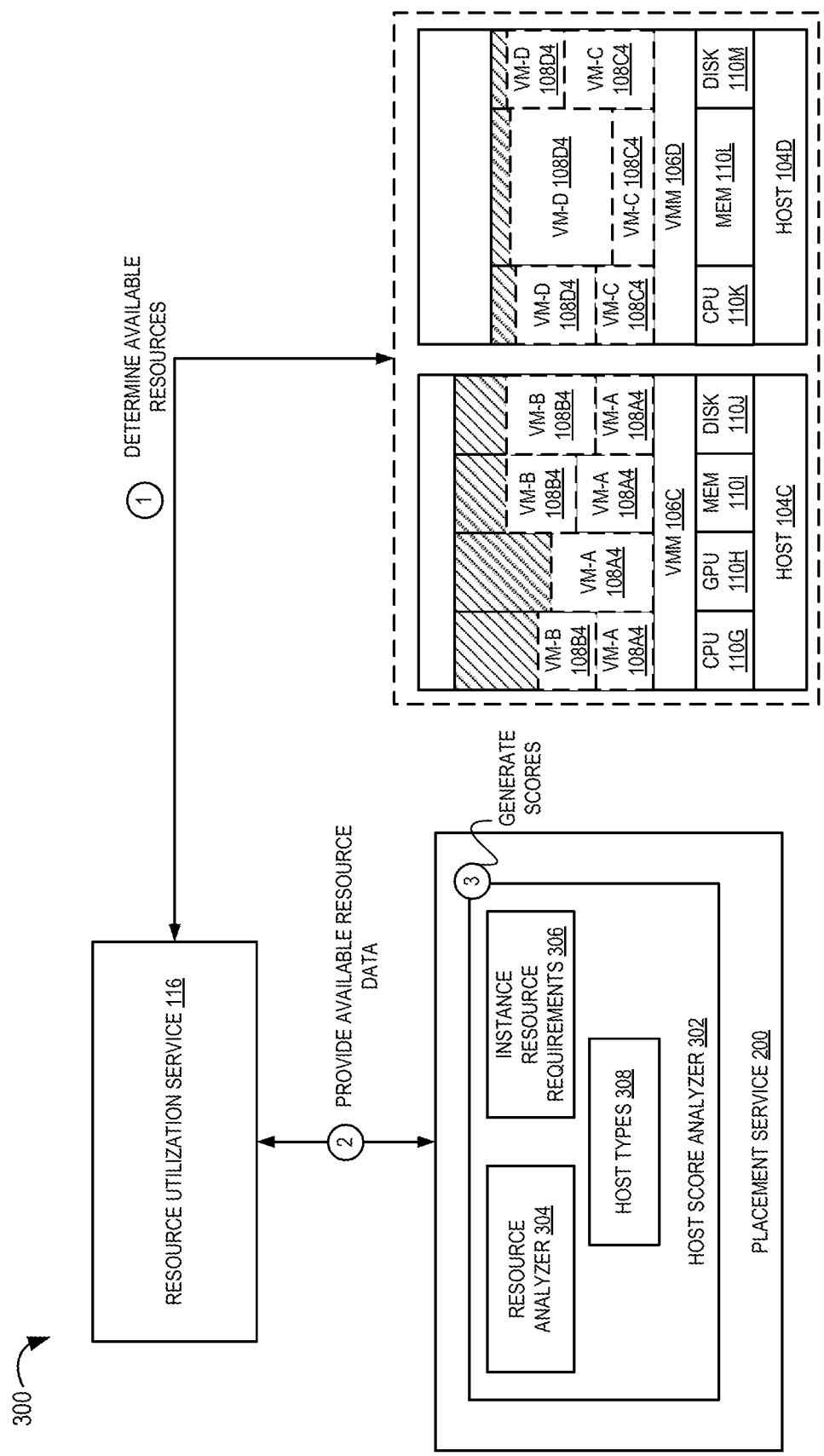
FIG. 3 is a diagram illustrating an environment determining virtual machine instance placement across heterogeneous physical hosts according to some embodiments.

FIG. 3 is a diagram illustrating an environment 300 determining virtual machine instance placement across heterogeneous physical hosts according to some embodiments. As shown in the embodiment of FIG. 3, a placement service 200 can determine scores for candidate hosts 104C and 104D to place four instances 108: VM-A 108A4, VM-B 108B4, VM-C 108C4, and VM-D 108D4. In some embodiments, each of these instances may be of a different instance type, with different resource requirements. At numeral 1, as discussed, resource utilization service 116 can monitor resource utilization of physical hosts 104. Based on the resource utilization of the physical hosts 104 and the total amount of resources provided by the physical hosts, the resource utilization service can determine current resource availability.

At numeral 2, placement service 200 can receive available resource data from resource utilization service 116. A host score analyzer 302 can include a resource analyzer 304 that coordinates instance resource requirements 306 and host types 308 to determine a placement score for each instance type. Instance resource requirements 306 can include the specific resources required by each instance type. Host types 308 can include resource configurations for each host type. Based on the available resources data received from resource utilization service 116, at numeral 3, host score analyzer 302 can determine a placement score for each physical host 104 for different instance types. For example, if the instance resource requirements match the available resources on a given physical host, that placement may receive the highest placement score. However, if a physical host has sufficient available resources to host an instance type, but the instance type does not fully utilize the available resources, then a lower placement score may be assigned. In some embodiments, a bin packing algorithm may be used to determine the placement score. For example, if an instance placement utilizes the available memory but does not utilize all of the available CPUs (or other resource), then the available CPU resources are wasted, reducing the placement score.

For example, as shown in FIG. 3, VM-A can be placed on host 104C to utilize GPU resource 110H. Although VMs VM-B and VM-C may both be accommodated by the resources on host 104C, this may result in GPU resources 110H being underutilized, as neither VM-B or VM-C require GPU resources. Instead, VM-B can be placed on host 104C and VM-C can be placed with VM-D on host 104D which is configured with additional memory resources 110L. This leaves additional capacity on host 104C for another instance that requires GPU resources.

Figure 4:
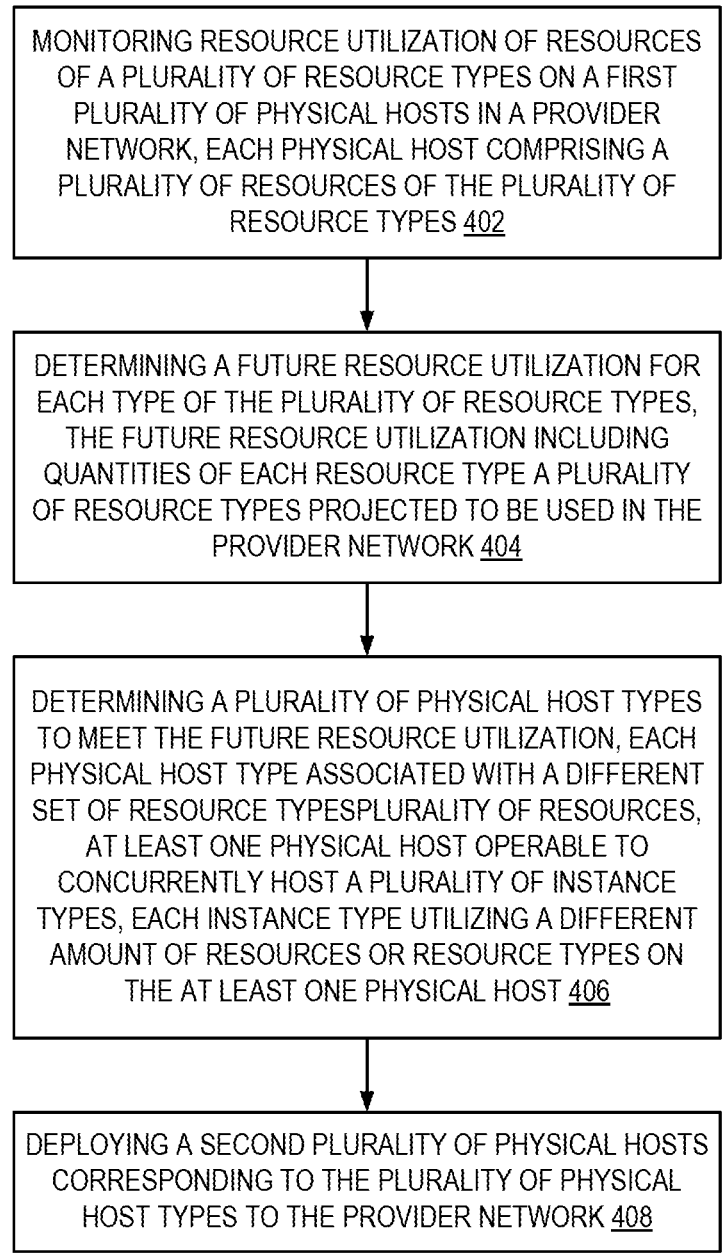
FIG. 4 is a flow diagram illustrating operations of a method for heterogeneous physical host utilization according to some embodiments.

FIG. 4 is a flow diagram illustrating operations 400 of a method for heterogeneous physical host utilization according to some embodiments. Some or all of the operations 400 (or other processes described herein, or variations, and/or combinations thereof) are performed under the control of one or more computer systems configured with executable instructions and are implemented as code (e.g., executable instructions, one or more computer programs, or one or more applications) executing collectively on one or more processors, by hardware or combinations thereof. The code is stored on a computer-readable storage medium, for example, in the form of a computer program comprising instructions executable by one or more processors. The computer-readable storage medium is non-transitory. In some embodiments, one or more (or all) of the operations 400 are performed by the resource utilization service and/or placement service of the other figures.

The operations 400 include, at block 402, monitoring resource utilization resources of a plurality of resource types on a first plurality of physical hosts in a provider network, each physical host comprising a plurality of resources of the plurality of resource types. In some embodiments, monitoring resource utilization may include determining a total amount of resources of each resource type in the first plurality of physical hosts, determining a number of resources in current use of each resource type, and calculating, for each resource type, a ratio of the number of resources in current use to the total amount of resources of each resource type.

The operations 400 include, at block 404, determining a future resource utilization for each type of the plurality of resource types, the future resource utilization including quantities of each resource type projected to be used in the provider network. The plurality of resource types including one or more of a number of central processing units (CPUs), graphics processing units (GPUs), disk space, memory, accelerators, field programmable gate arrays, or network bandwidth. In some embodiments, determining a future resource utilization may include determining a utilization history of the first plurality of physical hosts, the utilization history including resource utilization over a configurable amount of time, and determining the future resource utilization based at least on the utilization history using a machine learning model.

The operations 400 include, at block 406, determining a plurality of physical host types to meet the future resource utilization, each physical host type associated with a different set of resource types. In some embodiments, matching may include determining an optimal number of physical hosts, including one or more of the plurality of physical host types, to accommodate the future resource utilization using a bin packing algorithm. The operations 400 include, at block 408, deploying a second plurality of physical hosts corresponding to the plurality of physical host types to the provider network.

In some embodiments, a request can be received to create an instance type, the instance type associated with one or more resource requirements. A rank can be determined for each of the first plurality of physical hosts and second plurality of physical hosts based at least on the one or more resource requirements and an availability of each resource type on each of the first plurality of physical hosts and the second plurality of physical hosts. The instance type can be deployed to at least one candidate physical host based at least on their ranks. The one or more resource requirements include a range of values for one or more resource types on the at least one candidate physical host to be used by the instance. In some embodiments, usage values for the one or more resource types can be determined, the usage values indicating a quantity of the one or more resource types used by the instance type. A difference between the usage values and the one or more resource requirements can be determined and unused resources corresponding to the difference between the usage values and the one or more resource requirements can be returned to an available resource pool on the at least one candidate physical host.

In some embodiments, a request can be received to increase the one or more resource requirements. It can be determined that available resources on the at least one candidate physical host are greater than the increase in the one or more resource requirements. The available resources can be reallocated on the at least one candidate physical host to meet the increase in the one or more resource requirements.

Figure 5:
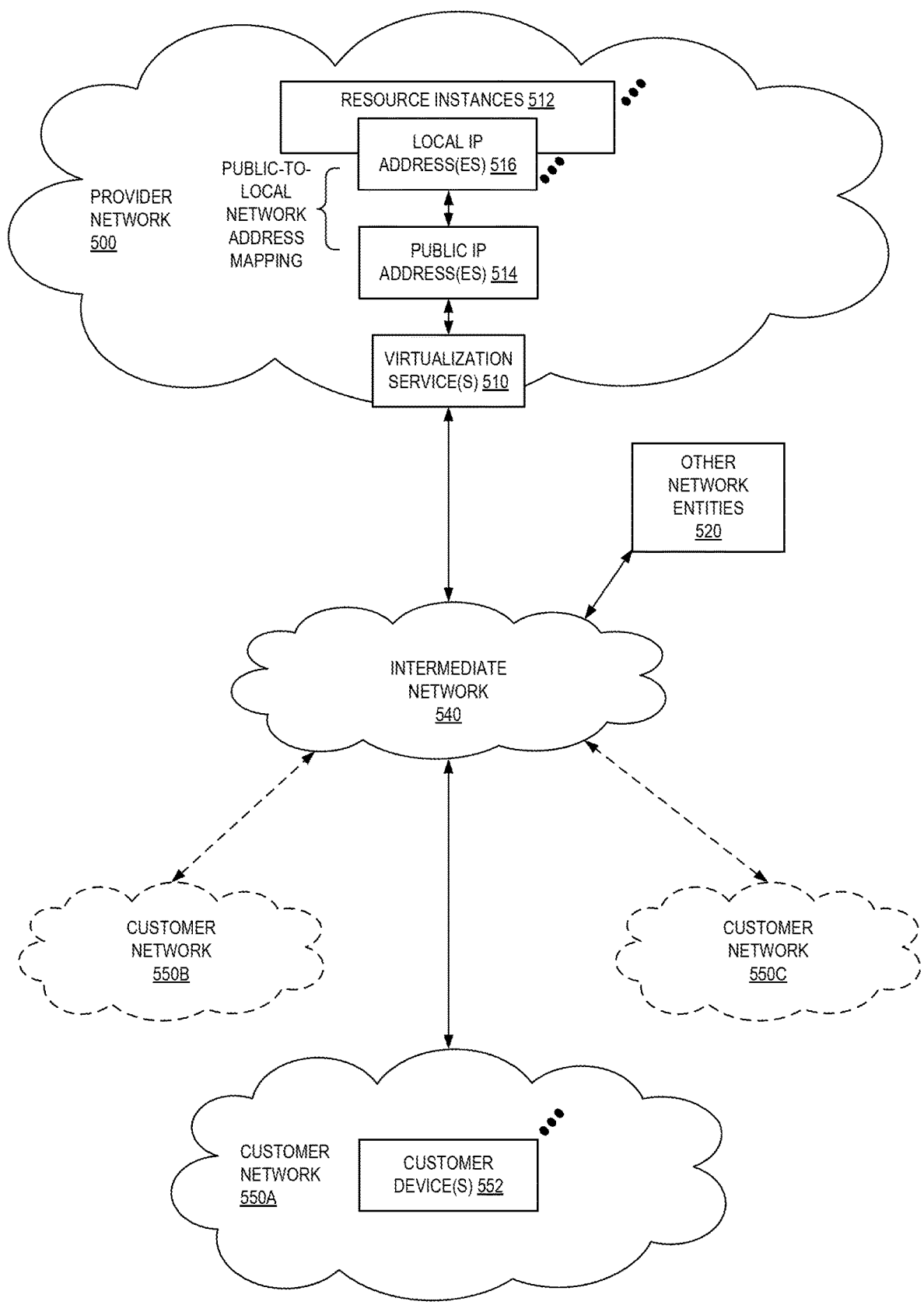
FIG. 5 illustrates an example provider network environment according to some embodiments.

FIG. 5 illustrates an example provider network (or "service provider system") environment according to some embodiments. A provider network 500 may provide resource virtualization to customers via one or more virtualization services 510 that allow customers to purchase, rent, or otherwise obtain instances 512 of virtualized resources, including but not limited to computation and storage resources, implemented on devices within the provider network or networks in one or more data centers. Local Internet Protocol (IP) addresses 516 may be associated with the resource instances 512; the local IP addresses are the internal network addresses of the resource instances 512 on the provider network 500. In some embodiments, the provider network 500 may also provide public IP addresses 514 and/or public IP address ranges (e.g., Internet Protocol version 4 (IPv4) or Internet Protocol version 6 (IPv6) addresses) that customers may obtain from the provider 500.

Conventionally, the provider network 500, via the virtualization services 510, may allow a customer of the service provider (e.g., a customer that operates one or more client networks 550A-550C including one or more customer device(s) 552) to dynamically associate at least some public IP addresses 514 assigned or allocated to the customer with particular resource instances 512 assigned to the customer. The provider network 500 may also allow the customer to remap a public IP address 514, previously mapped to one virtualized computing resource instance 512 allocated to the customer, to another virtualized computing resource instance 512 that is also allocated to the customer. Using the virtualized computing resource instances 512 and public IP addresses 514 provided by the service provider, a customer of the service provider such as the operator of customer network(s) 550A-550C may, for example, implement customer-specific applications and present the customer's applications on an intermediate network 540, such as the Internet. Other network entities 520 on the intermediate network 540 may then generate traffic to a destination public IP address 514 published by the customer network(s) 550A-550C; the traffic is routed to the service provider data center, and at the data center is routed, via a network substrate, to the local IP address 516 of the virtualized computing resource instance 512 currently mapped to the destination public IP address 514. Similarly, response traffic from the virtualized computing resource instance 512 may be routed via the network substrate back onto the intermediate network 540 to the source entity 520.

Local IP addresses, as used herein, refer to the internal or "private" network addresses, for example, of resource instances in a provider network. Local IP addresses can be within address blocks reserved by Internet Engineering Task Force (IETF) Request for Comments (RFC) 1918 and/or of an address format specified by IETF RFC 4193, and may be mutable within the provider network. Network traffic originating outside the provider network is not directly routed to local IP addresses; instead, the traffic uses public IP addresses that are mapped to the local IP addresses of the resource instances. The provider network may include networking devices or appliances that provide network address translation (NAT) or similar functionality to perform the mapping from public IP addresses to local IP addresses and vice versa.

Public IP addresses are Internet mutable network addresses that are assigned to resource instances, either by the service provider or by the customer. Traffic routed to a public IP address is translated, for example via 1:1 NAT, and forwarded to the respective local IP address of a resource instance.

Some public IP addresses may be assigned by the provider network infrastructure to particular resource instances; these public IP addresses may be referred to as standard public IP addresses, or simply standard IP addresses. In some embodiments, the mapping of a standard IP address to a local IP address of a resource instance is the default launch configuration for all resource instance types.

At least some public IP addresses may be allocated to or obtained by customers of the provider network 500; a customer may then assign their allocated public IP addresses to particular resource instances allocated to the customer. These public IP addresses may be referred to as customer public IP addresses, or simply customer IP addresses. Instead of being assigned by the provider network 500 to resource instances as in the case of standard IP addresses, customer IP addresses may be assigned to resource instances by the customers, for example via an API provided by the service provider. Unlike standard IP addresses, customer IP addresses are allocated to customer accounts and can be remapped to other resource instances by the respective customers as necessary or desired. A customer IP address is associated with a customer's account, not a particular resource instance, and the customer controls that IP address until the customer chooses to release it. Unlike conventional static IP addresses, customer IP addresses allow the customer to mask resource instance or availability zone failures by remapping the customer's public IP addresses to any resource instance associated with the customer's account. The customer IP addresses, for example, enable a customer to engineer around problems with the customer's resource instances or software by remapping customer IP addresses to replacement resource instances.

Figure 6:
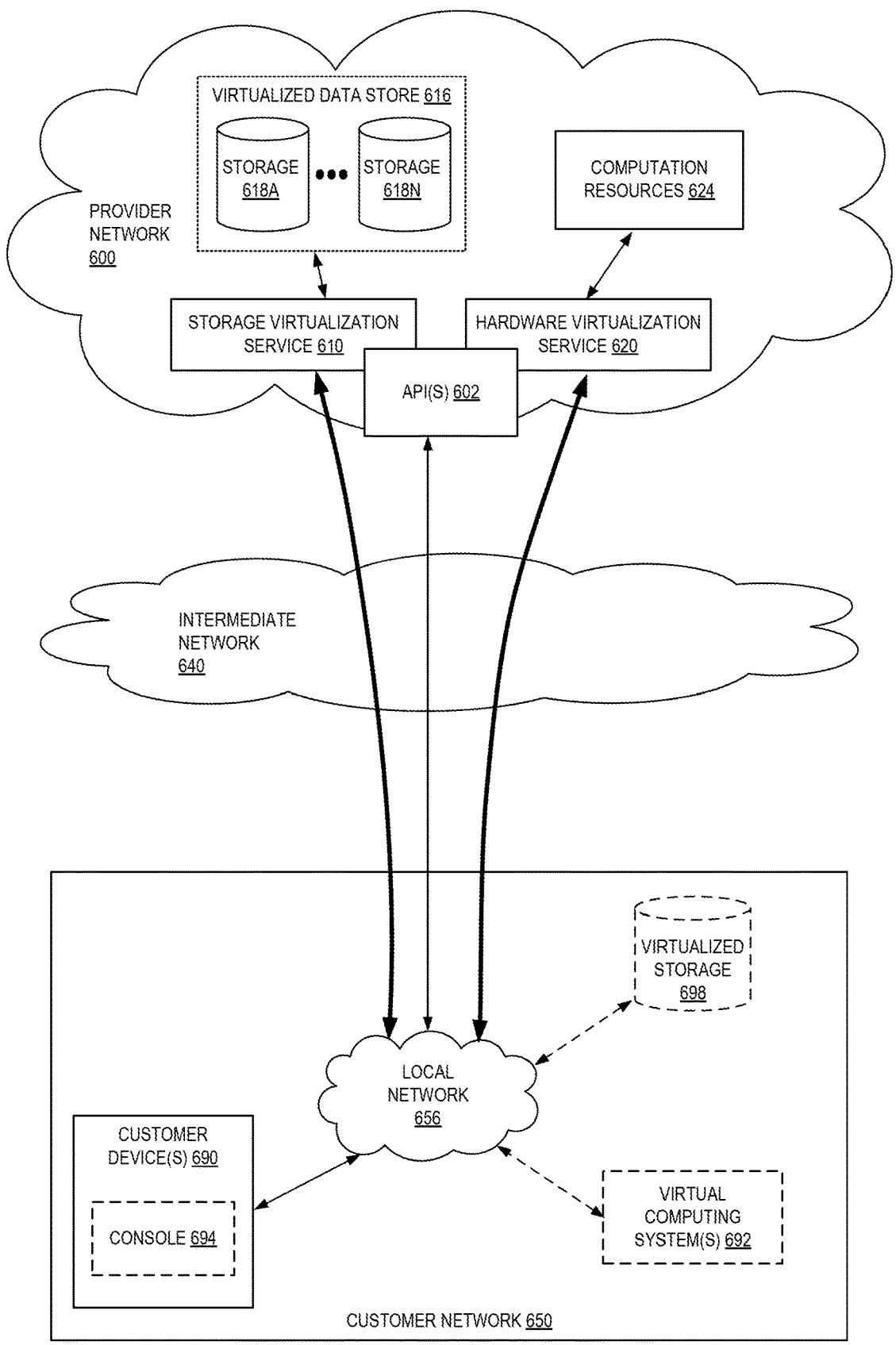
FIG. 6 is a block diagram of an example provider network that provides a storage virtualization service and a hardware virtualization service to customers according to some embodiments.

FIG. 6 is a block diagram of an example provider network that provides a storage virtualization service and a hardware virtualization service to customers, according to some embodiments. Hardware virtualization service 620 provides multiple computation resources 624 (e.g., VMs) to customers. The computation resources 624 may, for example, be rented or leased to customers of the provider network 600 (e.g., to a customer that implements customer network 650). Each computation resource 624 may be provided with one or more local IP addresses. Provider network 600 may be configured to route packets from the local IP addresses of the computation resources 624 to public Internet destinations, and from public Internet sources to the local IP addresses of computation resources 624.

Provider network 600 may provide a customer network 650, for example coupled to intermediate network 640 via local network 656, the ability to implement virtual computing systems 692 via hardware virtualization service 620 coupled to intermediate network 640 and to provider network 600. In some embodiments, hardware virtualization service 620 may provide one or more APIs 602, for example a web services interface, via which a customer network 650 may access functionality provided by the hardware virtualization service 620, for example via a console 694 (e.g., a web-based application, standalone application, mobile application, etc.). In some embodiments, at the provider network 600, each virtual computing system 692 at customer network 650 may correspond to a computation resource 624 that is leased, rented, or otherwise provided to customer network 650.

From an instance of a virtual computing system 692 and/or another customer device 690 (e.g., via console 694), the customer may access the functionality of storage virtualization service 610, for example via one or more APIs 602, to access data from and store data to storage resources 618A-618N of a virtual data store 616 provided by the provider network 600. In some embodiments, a virtualized data store gateway (not shown) may be provided at the customer network 650 that may locally cache at least some data, for example frequently accessed or critical data, and that may communicate with virtualized data store service 610 via one or more communications channels to upload new or modified data from a local cache so that the primary store of data (virtualized data store 616) is maintained. In some embodiments, a user, via a virtual computing system 692 and/or on another customer device 690, may mount and access virtual data store 616 volumes, which appear to the user as local virtualized storage 698.

Figure 7:
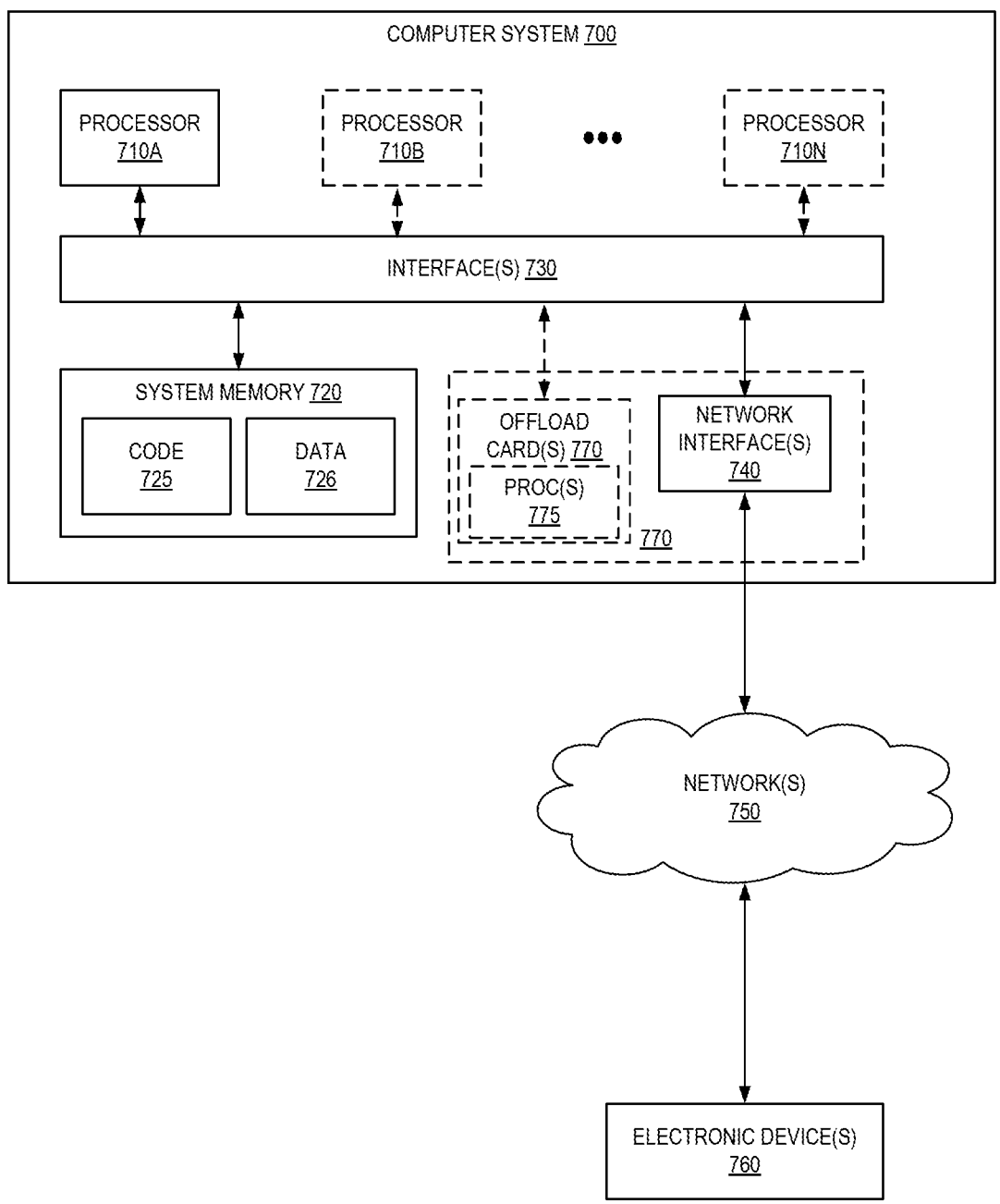
FIG. 7 is a block diagram illustrating an example computer system that may be used in some embodiments.

While not shown in FIG. 6, the virtualization service(s) may also be accessed from resource instances within the provider network 600 via API(s) 602. For example, a customer, appliance service provider, or other entity may access a virtualization service from within a respective virtual network on the provider network 600 via an API 602 to request allocation of one or more resource instances within the virtual network or within another virtual network.
Illustrative System In some embodiments, a system that implements a portion or all of the techniques for monitoring resource utilization across heterogeneous physical hosts as described herein may include a general-purpose computer system that includes or is configured to access one or more computer-accessible media, such as computer system 700 illustrated in FIG. 7. In the illustrated embodiment, computer system 700 includes one or more processors 710 coupled to a system memory 720 via an input/output (I/O) interface 730. Computer system 700 further includes a network interface 740 coupled to I/O interface 730. While FIG. 7 shows computer system 700 as a single computing device, in various embodiments a computer system 700 may include one computing device or any number of computing devices configured to work together as a single computer system 700.

In various embodiments, computer system 700 may be a uniprocessor system including one processor 710, or a multiprocessor system including several processors 710 (e.g., two, four, eight, or another suitable number). Processors 710 may be any suitable processors capable of executing instructions. For example, in various embodiments, processors 710 may be general-purpose or embedded processors implementing any of a variety of instruction set architectures (ISAs), such as the x86, ARM, PowerPC, SPARC, or MIPS ISAs, or any other suitable ISA. In multiprocessor systems, each of processors 710 may commonly, but not necessarily, implement the same ISA.

System memory 720 may store instructions and data accessible by processor(s) 710. In various embodiments, system memory 720 may be implemented using any suitable memory technology, such as random-access memory (RAM), static RAM (SRAM), synchronous dynamic RAM (SDRAM), nonvolatile/Flash-type memory, or any other type of memory. In the illustrated embodiment, program instructions and data implementing one or more desired functions, such as those methods, techniques, and data described above for resizing virtual networks in provider network environments, are shown stored within system memory 720 as code 725 and data 726.

In one embodiment, I/O interface 730 may be configured to coordinate I/O traffic between processor 710, system memory 720, and any peripheral devices in the device, including network interface 740 or other peripheral interfaces. In some embodiments, I/O interface 730 may perform any necessary protocol, timing or other data transformations to convert data signals from one component (e.g., system memory 720) into a format suitable for use by another component (e.g., processor 710). In some embodiments, I/O interface 730 may include support for devices attached through various types of peripheral buses, such as a variant of the Peripheral Component Interconnect (PCI) bus standard or the Universal Serial Bus (USB) standard, for example. In some embodiments, the function of I/O interface 730 may be split into two or more separate components, such as a north bridge and a south bridge, for example. Also, in some embodiments some or all of the functionality of I/O interface 730, such as an interface to system memory 720, may be incorporated directly into processor 710.

Network interface 740 may be configured to allow data to be exchanged between computer system 700 and other devices 760 attached to a network or networks 750, such as other computer systems or devices as illustrated in FIG. 1, for example. In various embodiments, network interface 740 may support communication via any suitable wired or wireless general data networks, such as types of Ethernet network, for example. Additionally, network interface 740 may support communication via telecommunications/telephony networks such as analog voice networks or digital fiber communications networks, via storage area networks (SANs) such as Fibre Channel SANs, or via I/O any other suitable type of network and/or protocol.

In some embodiments, a computer system 700 includes one or more offload cards 770 (including one or more processors 775, and possibly including the one or more network interfaces 740) that are connected using an I/O interface 730 (e.g., a bus implementing a version of the Peripheral Component Interconnect-Express (PCI-E) standard, or another interconnect such as a QuickPath interconnect (QPI) or UltraPath interconnect (UPI)). For example, in some embodiments the computer system 700 may act as a host electronic device (e.g., operating as part of a hardware virtualization service) that hosts compute instances, and the one or more offload cards 770 execute a virtualization manager that can manage compute instances that execute on the host electronic device. As an example, in some embodiments the offload card(s) 770 can perform compute instance management operations such as pausing and/or un-pausing compute instances, launching and/or terminating compute instances, performing memory transfer/copying operations, etc. These management operations may, in some embodiments, be performed by the offload card(s) 770 in coordination with a hypervisor (e.g., upon a request from a hypervisor) that is executed by the other processors 710A-710N of the computer system 700. However, in some embodiments the virtualization manager implemented by the offload card(s) 770 can accommodate requests from other entities (e.g., from compute instances themselves), and may not coordinate with (or service) any separate hypervisor.

In some embodiments, system memory 720 may be one embodiment of a computer-accessible medium configured to store program instructions and data as described above. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computer system 700 via I/O interface 730. A non-transitory computer-accessible storage medium may also include any volatile or non-volatile media such as RAM (e.g., SDRAM, double data rate (DDR) SDRAM, SRAM, etc.), read only memory (ROM), etc., that may be included in some embodiments of computer system 700 as system memory 720 or another type of memory. Further, a computer-accessible medium may include transmission media or signals such as electrical, electromagnetic, or digital signals, conveyed via a communication medium such as a network and/or a wireless link, such as may be implemented via network interface 740.

In the preceding description, various embodiments are described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Bracketed text and blocks with dashed borders (e.g., large dashes, small dashes, dot-dash, and dots) are used herein to illustrate optional operations that add additional features to some embodiments. However, such notation should not be taken to mean that these are the only options or optional operations, and/or that blocks with solid borders are not optional in certain embodiments.

Reference numerals with suffix letters (e.g., 104A-D, 106A-D, 108A1-A4, 108B1-B4, 108C1-C4, 108D1-D4, 110A-110M, etc.) may be used to indicate that there can be one or multiple instances of the referenced entity in various embodiments, and when there are multiple instances, each does not need to be identical but may instead share some general traits or act in common ways. Further, the particular suffixes used are not meant to imply that a particular amount of the entity exists unless specifically indicated to the contrary. Thus, two entities using the same or different suffix letters may or may not have the same number of instances in various embodiments.

References to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Moreover, in the various embodiments described above, unless specifically noted otherwise, disjunctive language such as the phrase "at least one of A, B, or C" is intended to be understood to mean either A, B, or C, or any combination thereof (e.g., A, B, and/or C). As such, disjunctive language is not intended to, nor should it be understood to, imply that a given embodiment requires at least one of A, at least one of B, or at least one of C to each be present.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

What is claimed is:

1. A computer-implemented method comprising:
receiving, by a hardware virtualization service, a first request to create a plurality of virtual machine types in a provider network;
creating, by the hardware virtualization service, the plurality of virtual machine types on a first plurality of hardware servers in the provider network to service the first request;
determining, by a resource utilization service, resource utilization of the plurality of virtual machine types on the first plurality of hardware servers in the provider network, at least one hardware server from the first plurality of hardware servers operable to concurrently host the plurality of virtual machine types, each virtual machine type utilizing a different set of resource types on the at least one hardware server;
determining, by the resource utilization service, a projected future resource type utilization for the different sets of resource types, including quantities of each resource type projected to be used in the provider network;
determining, by the resource utilization service, a plurality of physical host types to meet the projected future resource type utilization, each physical host type of the plurality of physical host types including a different set of resource types that are available to the virtual machine types deployed to a respective physical host type, the plurality of physical host types including a first physical host type having a first set of resource types and a second physical host type having a second set of resource types, wherein the first set of resource types includes at least one resource type not included in the second set of resource types;

deploying, by the resource utilization service to the provider network, a second plurality of hardware servers corresponding to the plurality of physical host types;

sending, by the hardware virtualization service to a placement service, a second request to place additional virtual machine instances in the provider network, wherein the additional virtual machine instances include: a first virtual machine instance of a first virtual machine type from the plurality of virtual machine types in the provider network and a second virtual machine instance of a second virtual machine type from the plurality of virtual machine types in the provider network;

receiving, by the placement service from the resource utilization service, resource utilization data;

determining, by the placement service, a placement score for a plurality of candidate hardware servers from the first plurality of hardware servers and the second plurality of hardware servers for each virtual machine type of the plurality of virtual machine types, the placement score determined using a bin packing algorithm based on a range of resources to be allocated to each virtual machine type, a virtual machine type to the physical host type mapping, and the projected future resource type utilization;

identifying, by the placement service, at least one candidate hardware server from the plurality of candidate hardware servers based at least on their placement scores and the resource utilization data received from the resource utilization service;

creating, by the hardware virtualization service, the first virtual machine instance on the at least one candidate hardware server, the first virtual machine instance being allocated a first range of resources available on the at least one candidate hardware server;

monitoring, by the resource utilization service, current resource utilization of the first virtual machine instance on the at least one candidate hardware server;

comparing, by the resource utilization service, current resource utilization of the first virtual machine instance to the first range of resources to determine excess resources allocated to the first virtual machine instance;

returning, by the resource utilization service, the excess resources to an available resource pool on the at least one candidate hardware server; and creating, by the hardware virtualization service, the second virtual machine instance on the at least one candidate hardware server, the second virtual machine instance allocated a second range of resources from the available resource pool on the at least one candidate hardware server.

2. The computer-implemented method of claim 1, wherein the resource utilization includes utilization of one or more of central processing units (CPUs), graphics processing units (GPUs), disk space, memory, or network bandwidth.

3. The computer-implemented method of claim 1, wherein determining the projected future resource type utilization for the different sets of resource types is based at least on a usage model trained using historical resource utilization data, and wherein the method further comprises matching the projected future resource type utilization for the different sets of resource types to a plurality of hardware server types using the bin packing algorithm.

4. A computer-implemented method comprising:
receiving, by a hardware virtualization service, a first request to create a plurality of virtual machine types in a provider network;

creating, by the hardware virtualization service, the plurality of virtual machine types on a first plurality of physical hosts in the provider network to service the first request;

monitoring, by a resource utilization service, resource utilization of resources of the plurality of virtual machine types on the first plurality of physical hosts in the provider network, at least one physical host from the first plurality of physical hosts operable to concurrently host the plurality of virtual machine types, each virtual machine type utilizing a different set of resource types on the at least one physical host;

determining, by the resource utilization service, a projected future resource type utilization for the different sets of resource types, the projected future resource type utilization including quantities of each resource type projected to be used in the provider network;

determining, by the resource utilization service, a plurality of physical host types to meet the projected future resource type utilization, each physical host type of the plurality of physical host types including a different set of resource types which are available to the virtual machine types deployed to a respective physical host type of the plurality of physical host types, the plurality of physical host types including a first physical host type having a first set of resource types and a second physical host type having a second set of resource types, wherein the first set of resource types includes at least one resource type not included in the second set of resource types;

deploying, by the resource utilization service to the provider network, a second plurality of physical hosts corresponding to the plurality of physical host types;

sending, by the hardware virtualization service to a placement service, a second request to place additional virtual machine instances in the provider network, wherein the additional virtual machine instances include: a first virtual machine instance of a first virtual machine type from the plurality of virtual machine types in the provider network and a second virtual machine instance of a second virtual machine type from the plurality of virtual machine types in the provider network;

receiving, by the placement service from the resource utilization service, resource utilization data;

determining, by the placement service, a placement score for a plurality of candidate physical hosts from the first plurality of physical hosts and the second plurality of physical hosts for each virtual machine type of the plurality of virtual machine types, the placement score determined using a bin packing algorithm based on a range of resources to be allocated to each virtual machine type, a virtual machine type to the physical host type mapping, and the projected future resource type utilization;

identifying, by the placement service, at least one candidate physical host from the plurality of candidate physical hosts based at least on their placement scores and the resource utilization data received from the resource utilization service;

creating, by the hardware virtualization service, the first virtual machine instance on the at least one candidate physical host, the first virtual machine instance being allocated a first range of resources available on the at least one candidate physical host, monitoring, by the resource utilization service, current resource utilization of the first virtual machine instance on the at least one candidate physical host;

comparing, by the resource utilization service, current resource utilization of the first virtual machine instance to the first range of resources to determine excess resources allocated to the first virtual machine instance;

returning, by the resource utilization service, the excess resources to an available resource pool on the at least one candidate physical host; and deploying, by the hardware virtualization service, the second virtual machine instance on the at least one candidate physical host, the second virtual machine instance allocated a second range of resources from the available resource pool on the at least one candidate physical host.

5. The computer-implemented method of claim 4, wherein the plurality of resource types includes one or more of central processing units (CPUs), graphics processing units (GPUs), disk space, memory, accelerators, field programmable gate arrays, or network bandwidth.

6. The computer-implemented method of claim 4, wherein determining, by the resource utilization service, the plurality of physical host types to meet the projected future resource type utilization further comprises determining an optimal number of physical hosts, including one or more of the plurality of physical host types, to accommodate the projected future resource type utilization using the bin packing algorithm.

7. The computer-implemented method of claim 4, wherein monitoring resource utilization of resources of the plurality of resource types on the first plurality of physical hosts in the provider network, each physical host comprising a plurality of resources of the plurality of resource types, further comprises:

determining a total amount of resources of each resource type in the first plurality of physical hosts;

determining a number of resources in current use of each resource type; and calculating, for each resource type, a ratio of the number of resources in current use to the total amount of resources of each resource type.

8. The computer-implemented method of claim 4, wherein determining the projected future resource type utilization for each type of the plurality of resource types, the projected future resource type utilization including quantities of each resource type projected to be used in the provider network, further comprises:

determining a utilization history of the first plurality of physical hosts, the utilization history including resource utilization over a configurable amount of time; and determining the projected future resource type utilization based at least on the utilization history using a machine learning model.

9. The computer-implemented method of claim 8, further comprising:

monitoring, by the resource utilization service, requests for additional virtual machine instances;

comparing the requests for additional virtual machine instances to the projected future resource type utilization;

determining a difference between the projected future resource type utilization and actual demand for virtual machine instances; and using the difference between the projected future resource type utilization and actual demand for virtual machine instances to further train the machine learning model to increase accuracy of future projected demand for virtual machine instances.

10. The computer-implemented method of claim 4, wherein the first virtual machine type is associated with one or more resource requirements, and wherein the one or more resource requirements include a range of values for one or more resource types on the at least one candidate physical host to be used by the first virtual machine type.

11. The computer-implemented method of claim 10, further comprising:

determining usage values for the one or more resource types, the usage values indicating a quantity of the one or more resource types used by the first virtual machine type;

determining a difference between the usage values and the one or more resource requirements; and returning unused resources corresponding to the difference between the usage values and the one or more resource requirements to the available resource pool on the at least one candidate physical host.

12. The computer-implemented method of claim 11, further comprising:

receiving a third request to increase the one or more resource requirements;

determining that available resources on the at least one candidate physical host are greater than the increase in the one or more resource requirements; and reallocating the available resources on the at least one candidate physical host to meet the increase in the one or more resource requirements.

13. A system comprising:

a hardware virtualization service of a provider network implemented by a first one or more electronic devices comprising physical hosts to execute workloads on behalf of users of the provider network, the hardware virtualization service including a first set of instructions that upon execution causes the hardware virtualization service to:

receive a first request to create a plurality of virtual machine types in the provider network; and create the plurality of virtual machine types on a first plurality of the physical hosts in the provider network to service the first request;

the system further comprising a resource utilization service implemented by a second one or more electronic devices in the provider network, the resource utilization service including a second set of instructions that upon execution causes the resource utilization service to:

monitor resource utilization of resources of the plurality of virtual machine types on the first plurality of physical hosts in the provider network, at least one physical host from the first plurality of physical hosts operable to concurrently host the plurality of virtual machine types, each virtual machine type utilizing a different set of resource types on the at least one physical host;

determine a projected future resource type utilization for the different sets of resource types, the projected future resource type utilization including quantities of each resource type projected to be used in the provider network;

determine a plurality of physical host types to meet the projected future resource type utilization, each physical host type of the plurality of physical host types including a different set of resource types which are available to the virtual machine types deployed to a respective physical host type of the plurality of physical host types, the plurality of physical host types including a first physical host type having a first set of resource types and a second physical host type having a second set of resource types, wherein the first set of resource types includes at least one resource type not included in the second set of resource types; and deploy to the provider network a second plurality of physical hosts corresponding to the plurality of physical host types;

wherein the first set of instructions upon execution further causes the hardware virtualization service to:

send, to a placement service implemented by a third one or more electronic devices in the provider network, a second request to place additional virtual machine instances in the provider network, wherein the additional virtual machine instances include: a first virtual machine instance of a first virtual machine type from the plurality of virtual machine types in the provider network and a second virtual machine instance of a second virtual machine type from the plurality of virtual machine types in the provider network;

wherein the placement service includes a third set of instructions that upon execution causes the placement service to:

receive, from the resource utilization service, resource utilization data;

determine a placement score for a plurality of candidate physical hosts from the first plurality of physical hosts and the second plurality of physical hosts for each virtual machine type of the plurality of virtual machine types, the placement score determined using a bin packing algorithm based on a range of resources to be allocated to each virtual machine type, a virtual machine type to the physical host type mapping, and the projected future resource type utilization; and identify at least one candidate physical host from the plurality of candidate physical hosts based at least on their placement scores and the resource utilization data received from the resource utilization service;

wherein the first set of instructions upon execution further causes the hardware virtualization service to:

create the first virtual machine instance on the at least one candidate physical host, the first virtual machine instance being allocated a first range of resources available on the at least one candidate physical host;

wherein the second set of instructions upon execution further causes the resource utilization service to:

monitor current resource utilization of the first virtual machine instance on the at least one candidate physical host;

compare current resource utilization of the first virtual machine instance to the first range of resources to determine excess resources allocated to the first virtual machine instance; and return the excess resources to an available resource pool on the at least one candidate physical host;

wherein the first set of instructions upon execution further causes the hardware virtualization service to:

deploy the second virtual machine instance on the at least one candidate physical host, the second virtual machine instance allocated a second range of resources from the available resource pool on the at least one candidate physical host.

14. The system of claim 13, wherein the plurality of resource types includes one or more of central processing units (CPUs), graphics processing units (GPUs), disk space, memory, accelerators, field programmable gate arrays, or network bandwidth.

15. The system of claim 13, wherein to determine the plurality of physical host types to meet the projected future resource type utilization, the resource utilization service includes further instructions that, when executed, further cause the resource utilization service to:

determine an optimal number of physical hosts, including one or more of the plurality of physical host types, to accommodate the projected future resource type utilization using the bin packing algorithm.

16. The system of claim 13, wherein to monitor resource utilization of resources of the plurality of virtual machine types on the first plurality of physical hosts in the provider network, the resource utilization service includes further instructions that, when executed, further cause the resource utilization service to:

determine a total amount of resources of each resource type in the first plurality of the physical hosts;

determine a number of resources in current use of each resource type; and calculate, for each resource type, a ratio of the number of resources in current use to the total amount of resources of each resource type.

17. The system of claim 13, wherein to determine a projected future resource type utilization for the different sets of resource types, the resource utilization service includes further instructions that, when executed, further cause the resource utilization service to:

determine a utilization history of the first plurality of the physical hosts, the utilization history including resource utilization over a configurable amount of time; and determine the projected future resource type utilization based at least on the utilization history using a machine learning model.

18. The system of claim 17, wherein the resource utilization service includes further instructions that, when executed, further cause the resource utilization service to:

monitor requests for additional virtual machine instances;

compare the requests for additional virtual machine instances to the projected future resource type utilization;

determine a difference between the projected future resource type utilization and actual demand for virtual machine instances; and use the difference between the projected future resource type utilization and actual demand for virtual machine instances to further train the machine learning model to increase accuracy of future projected demand for virtual machine instances.

19. The system of claim 13, wherein the first virtual machine type is associated with one or more resource requirements, and wherein the one or more resource requirements include a range of values for one or more resource types on the at least one candidate physical host to be used by the first virtual machine type.

20. The system of claim 19, wherein the resource utilization service includes further instructions that, when executed, further cause the resource utilization service to:
- determine usage values for the one or more resource types, the usage values indicating a quantity of the one or more resource types used by the first virtual machine type;
- determine a difference between the usage values and the one or more resource requirements; and
- return unused resources corresponding to the difference between the usage values and the one or more resource requirements to the available resource pool on the at least one candidate physical host.

\* \* \* \* \*